(12) United States Patent
Weiss

(10) Patent No.: US 8,087,825 B2
(45) Date of Patent: Jan. 3, 2012

(54) MECHANICAL AND ELECTRONIC TEMPERATURE READING SYSTEM WITH BUILT-IN FAILURE AND INACCURACY DETECTION

(75) Inventor: John Weiss, Oakdale, NY (US)

(73) Assignee: Weiss Instruments, Inc., Holtsville, NY (US)

( * ) Notice: Subject to any disclaimer, the term of this patent is extended or adjusted under 35 U.S.C. 154(b) by 249 days.

(21) Appl. No.: 12/643,163

(22) Filed: Dec. 21, 2009

(65) Prior Publication Data

US 2011/0150027 A1    Jun. 23, 2011

(51) Int. Cl.
*G01K 5/00* (2006.01)
*G01K 9/00* (2006.01)
*G01K 15/00* (2006.01)

(52) U.S. Cl. ............................................. 374/203; 374/1
(58) Field of Classification Search .................. 374/203, 374/1
See application file for complete search history.

(56) References Cited

U.S. PATENT DOCUMENTS

| | | | | |
|---|---|---|---|---|
| 3,114,903 A | * | 12/1963 | Murphy et al. | |
| 3,302,460 A | * | 2/1967 | Irwin et al. | 374/143 |
| 3,780,589 A | * | 12/1973 | Fruit | 73/705 |
| 4,267,413 A | * | 5/1981 | Reis | |
| 4,646,406 A | * | 3/1987 | Weiss et al. | 148/524 |
| 4,733,974 A | * | 3/1988 | Hagerman | |
| 4,745,571 A | * | 5/1988 | Foster | |
| 4,754,405 A | * | 6/1988 | Foster | |
| 5,816,708 A | * | 10/1998 | Urich | 374/203 |
| 5,895,861 A | * | 4/1999 | Slonaker | 73/732 |
| 6,492,608 B1 | * | 12/2002 | Sun | |
| 7,004,626 B1 | * | 2/2006 | Giberson et al. | 374/179 |
| 7,322,744 B2 | * | 1/2008 | Ferguson et al. | 374/195 |
| 7,469,591 B1 | * | 12/2008 | Chuang | 73/732 |

OTHER PUBLICATIONS

Messko, Technical Brochure IN2100/00/01 entitled "Universal Retrofit Kit." Reinhausen Manufacturing Inc., 2549 North 9th Avenue, Humboldt, IN 38343 (6 pages).
Qualitrol 104/TR6000, Product Brochure, Qualitrol Company, LLC, 1385 Fairport Road, Fairport, NY 14450 (12 pages).
Sandelius Model PR5335 Product Brochure, Sandelius Instruments, P. O. Box 30098, Houston, Texas 77249 (2 pages).

* cited by examiner

*Primary Examiner* — Lisa Caputo
*Assistant Examiner* — Jamel Williams
(74) *Attorney, Agent, or Firm* — Robert P. Michal; Lucas & Mercanti, LLP

(57) ABSTRACT

Temperature-indicting system including a mechanical temperature-indicating system including a bourdon tube for directly driving an indicating pointer, and an electrical temperature-indicating system including an electronic sensor, a transmitter and one or more electrical switches. The transmitter is modular and easily replaceable. Output of the pointer and the transmitter is synchronized relative to accuracy so that comparison of switch points of the switches that correlate temperature determined by the mechanical system and temperature determined by the electronic system enables detection of a failure or inaccuracy in one or both systems.

20 Claims, 5 Drawing Sheets

MECHANICAL AND ELECTRONIC TEMPERATURE READING SYSTEM WITH BUILT-IN FAILURE AND INACCURACY DETECTION

FIELD OF THE INVENTION

This invention relates generally to instruments used to monitor and control power transformers that are subject to harsh environments and furthermore, to power transformer monitoring and control instruments having improved reliability in that they feature a dual and redundant monitoring and control system.

BACKGROUND OF THE INVENTION

Traditionally, control of power transformers entails use of a mechanical thermometer with a high torque mechanism that can operate up to six switches to control cooling apparatus of the power transformer, such as circulating oil pumps and fans, with the switches being sellable by the user. The switches set in the highest part of their possible range are typically used for high temperature alarms and emergency shut down.

The two major types of power transformers are oil temperature controls and winding temperature controls. A winding control sensor is normally mounted in a thermowell that includes a heater having a current that is proportional to the main transformer load current. With the advent of computers, it has become popular to generate an electronic signal from both the oil and the winding control sensor for input to a computer for remote monitoring and to collect the temperature data history.

Thermometers with switches as output to control equipment have been widely used. For example, U.S. Pat. No. 3,114,903 (Murphy) includes a switch inside a case of a pressure gauge or thermometer for use as an alarm or safety shutdown.

Attempts have been made to replace the mechanical controls with electronic controls that offer advantages such as calculating and compensating functions. In this regard, U.S. Pat. No. 4,745,571 (Foster) describes a conventional mechanical system for control and monitoring of power transformers using separate winding and oil mechanical systems and improves on this conventional system by incorporating fully electronic controls. While some of these electronic controls are in use, the resistance of users to depend on electronics is strong in view of the harsh environments that electronics are subject to including for example, temperature extremes, both high and low humidity levels, high electromagnetic fields, and lightning. It is more common to combine the electronics as an output feature into the traditional filled system remote mechanical controls.

One common method for combining an output for computer monitoring is described by Messko in a technical brochure IN2100/00/01 entitled "Universal Retrofit Kit". In the Messko control technique, a thin film pressure transducer is soldered into the liquid-filled thermal system within the case housing, and a correlation is made between pressure and temperature and converted to a 4 mA to 20 mA current output corresponding to 0° C. to 160° C. The current is typically connected to a precision resistor and the voltage across the resistor is read by an Analog to digital converter for use in a data acquisition computer, this 4 to 20 milliamp current loop being a common technique used in industrial automation and control.

Another method of integrating the output signal with a mechanical control is to use a precision potentiometer connected to the shaft of the mechanical control pointer in combination with a circuit to convert to a current loop signal. Both of these methods have the limitation of being dependent on the integrity of the filled systems, liquid filled in both cases, and having accuracy, repeatability and environmental errors no better than the filled system that they are dependent upon. Another disadvantage of these methods is that the entire control system would need to be replaced in the case of a failure requiring the transformer to be shut down.

The prior art systems inherently include errors due to ambient temperature changes because the liquid in the capillary and head usually expands with higher exposure temperature and contracts with lower exposure temperatures. A compensator is normally included in the instrument housing to offset this error at one point, usually at the mid point of the span, but no attempt is made to compensate for the change of the capillary temperature. The compensation techniques may include their own accuracy offset and need to be tested, sorted and matched to the thermal system and only at one temperature point. In addition, the compensation is not integrated in the electronic output thereby causing wide discrepancies between the mechanical and electronic systems, which in turn, cause an ambiguity regarding what the actual temperature is and thus whether to rely on the temperature measurement provided by the mechanical system indicator or by the electronic output.

SUMMARY OF THE INVENTION

An indicating temperature switch in accordance with the invention includes an electronic temperature sensor integrally mounted in the top of a filled system bulb having substantially the same thermal path to the process being measured, and connection wires protected within capillary armor and entering a thermometer case with a connecting capillary. The capillary is connected to a low volume bourdon tube that directly drives an indicator pointer and multiple switches. The sensor wires are connected to a modular transmitter that can easily be replaced by removing a front window of the case detaching and reattaching the sensor and loop control wires and closing the front window.

A low volume enhanced gas thermal system with a low expansion and low elastic temperature coefficient is used to avoid the need for a mechanical system compensator. Such a low ambient thermal system is described, for example, in the inventors' earlier U.S. Pat. No. 4,646,406, incorporated by reference herein. The pointer and switches are directly operated to provide 180° angular rotation to improve accuracy in temperature and switch settings and to maintain a low switch differential.

The rotating bourdon tube drives a plurality of switches, e.g., six or more, with a shifting micro switch arrangement, such as that described in U.S. Pat. No. 6,492,608 incorporated by reference herein, to avoid the additive effect of friction.

The combination of the duality and redundancy of the mechanical and electronic systems with the low ambient effect thermal system and the common thermal path of the mechanical and electrical sensor renders the present invention advantageous in comparison to conventional temperature indicating systems.

BRIEF DESCRIPTIONS OF THE DRAWINGS

The invention, together with further objects and advantages thereof, may best be understood by reference to the following description taken in conjunction with the accompanying drawings wherein like reference numerals identify like elements.

DETAILED DESCRIPTION OF THE PREFERRED EMBODIMENTS

Figure 1:
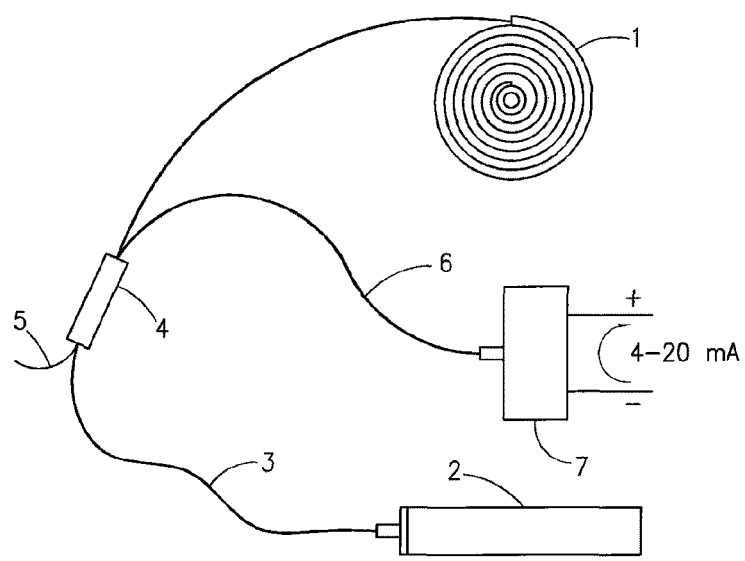
FIG. 1 shows a prior art filled system with a pressure transducer attached to a capillary.

Referring to the accompanying drawings wherein like reference numerals refer to the same or similar elements, FIG. 1 shows a prior art liquid-filled thermal system including a spiral bourdon tube 1, and a sensing bulb 2 attached to the bourdon tube 1 by a connecting capillary 3. The connecting capillary 3 can be only a few meters in length up to 20 meters long. The connecting capillary 3 and bourdon tube 1 are attached with a connector 4 that also includes a fill tube 5 and another capillary 6 that is attached to a pressure transducer 7, e.g., soldered thereto. The pressure transducer 7 senses the internal pressure of the system at the case near the bourdon tube 1. The spiral bourdon tube 1 rotates in a clockwise manner with increasing pressure and drives a pointer and several switches, not shown.

Figure 2:
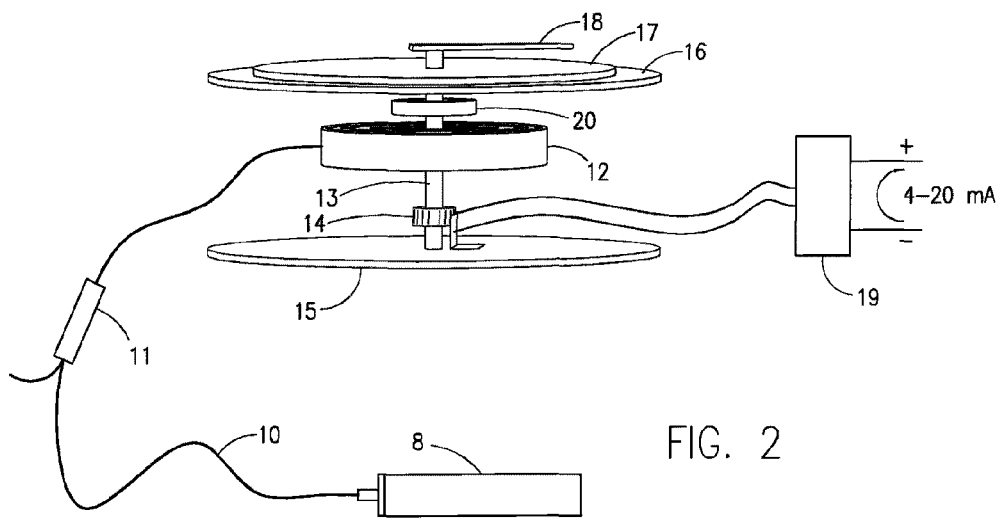
FIG. 2 shows a prior art filled system with a potentiometer attached to a pointer shaft.

FIG. 2 illustrates another arrangement of the prior art liquid-filled system including similar elements as shown in the system of FIG. 1, namely, a sensing bulb 8, connecting capillary 10, connector 11 and a spiral bourdon tube 12. In this embodiment, the spiral bourdon tube 12 is attached to a shaft 13 suspended between bearing plates 15 and 16 and drives an indicating pointer 18 over a scale 17. The shaft 13 is also attached to a rotation sensor 14, which may be, for example, a precision potentiometer. The rotation sensor 14 is part of a circuit 19 that converts the angle of rotation sensed by rotation sensor 14 to, for example, a 4 to 20 milliamp output. The advantage of this embodiment over the embodiment shown in FIG. 1 is that adjustment of the bourdon position adjusts the potentiometer as well as the pointer 18, and adjustment of the pointer 18 alone does not generate the 4 to 20 mA output signal. The adjustment is generally called an offset adjustment and is used to make one point of the range more accurate.

Another element connecting the bourdon tube 12 to the shaft 13 is a bimetallic compensator 20 that also has a rotation effect to counteract, or compensate for the effect of ambient temperature error as a result of the volume expansion of the liquid in the bourdon tube 12 and capillary 10. Bimetallic compensator 20 also compensates for the effect of temperature on properties of the bourdon tube 12, e.g., the length expansion and strength, spring rate and other changes of the bourdon tube 12.

The prior art thermal system of FIG. 1 may also include a compensating bimetallic compensator. Other systems not described here use counteracting or counter bellows to drive a mechanism effecting rotary motion, and in these constructions the counter bellows is expected to compensate for ambient temperature changes. The same counter balanced spiral bourdons could also be used; however, these systems restrict the output and/or increase the internal pressure causing less accuracy and resolution and higher ambient error at the extremes of the temperature indicating range.

All of the prior art systems described above have only a single point temperature compensation and have the transmitter output directly responsive to the mechanical system, whereby a failure of the mechanical system also causes the electrical system to fail, and a failure of the electrical transmitter requires the replacement of the entire system. A slow leak, for example, would cause the mechanical system and the electronic output to both read low and some time may pass before the low readings are discovered.

Figure 3A:
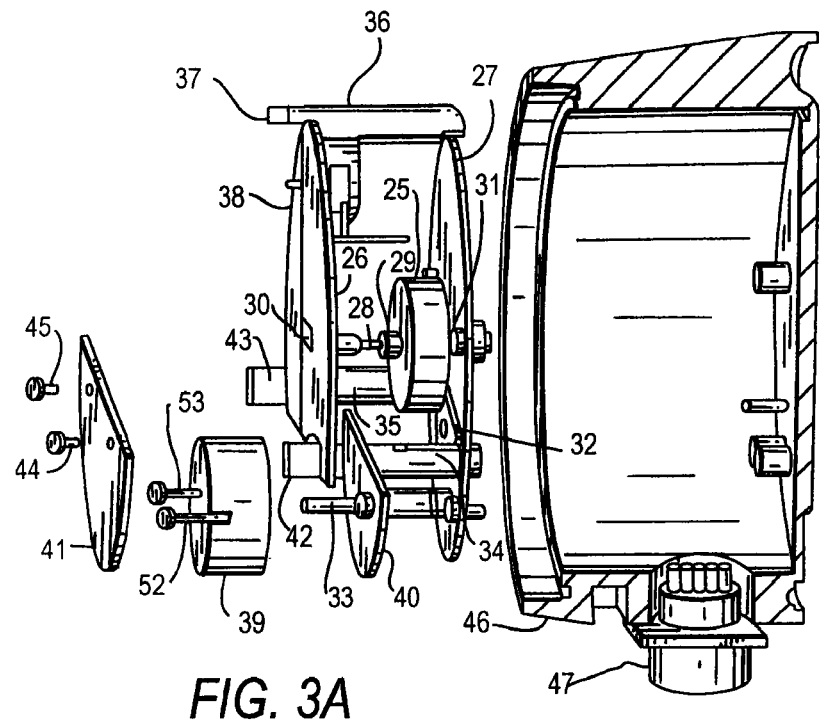
FIGS. 3A and 3B are exploded views of a dual temperature indicating system of a preferred embodiment of the invention.
Figure 3B:
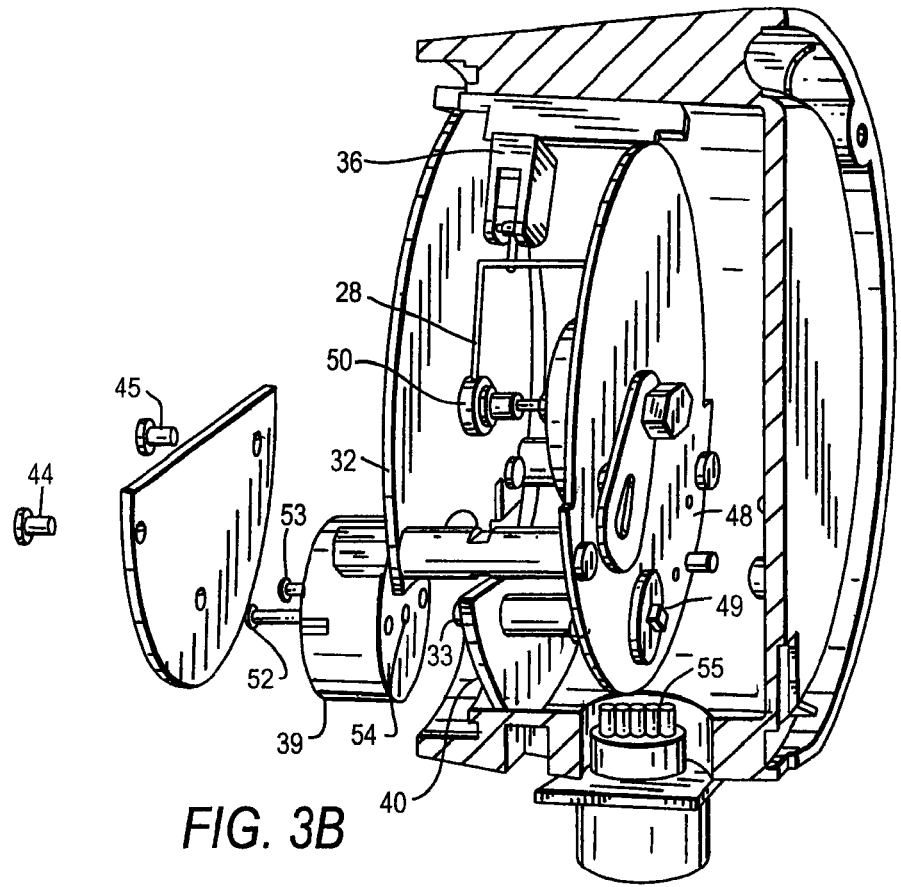

Referring now to FIGS. 3A and 3B which illustrates a preferred embodiment of a system in accordance with the invention, FIG. 3A shows the arrangement of the components of the system including a mechanical temperature-responsive system having a low ambient temperature error and being filled with a thermometric filling material, and an electronic temperature system including a temperature sensor and a replaceable electronic transmitter including a temperature sensor in thermal contact with the temperature sensing chamber of the mechanical temperature responsive system. The mechanical and electronic systems provide substantially the same temperature reading over a wide ambient temperature range.

More specifically, the system includes an uncompensated, edge welded, spiral bourdon tube 25 mounted between an upper mounting plate 26 and a lower mounting plate 27 with a shaft 28 rigidly attached to a hub 29 of the bourdon tube 25. Bourdon tube 25 may be a low volume, edge-welded bourdon tube, and additionally or alternatively, may have either a spiral or a helical form.

To reduce friction, the shaft 28 is pivoted through an upper bearing 30 and a lower bearing 31. A bourdon tube mounting bracket 32 is brazed to the bourdon tube 25 and attached to the lower mounting plate 27 through an adjustable gear mechanism, not shown in FIG. 3A, that attaches to a zero offset adjustment shaft 33. The upper and lower mounting plates 26, 27 are rigidly attached to one another by an attachment mechanism, such as a pair of spaced apart posts 34 and 35.

An adjustable switch assembly 36 rides on the upper mounting plate 26 and has a switch or set point indicator 37 that coincides with the divisions in a scale 38. Switch assembly 36 may be a cam drive switch assembly. Although only one switch is shown in the switch assembly 36, typically up to six switches are used for control and alarm functions. A 4 to 20 milliamp transmitter 39 has a center hole that fits over the zero offset adjustment shaft 33 and is mounted to an auxiliary mounting plate 40 secured to the lower mounting plate 27. A cover plate 41 is attached to standoffs 42 and 43, for example, with screws 44 and 45.

The entire assembly is inserted into a protective case 46 that includes a detachable 14-pin electrical connector 47. The thermal system, i.e., the system including the temperature sensing chamber or temperature bulb, is attached to the spiral bourdon tube 25 by a capillary and case through a fitting. Once assembled, the 4 to 20 milliamp transducer can be easily accessed by the removal of the two screws 44 and 45 and the cover plate 41.

An access hole in the cover plate 41 allows offset adjustment of the mechanical system without removing the cover plate 41.

FIG. 3B shows the inside view of the exploded system. Gears 48 and 49 are attached to the zero offset adjustment shaft 33 and to the bourdon tube mounting bracket 32 to enable adjustment of the mechanical indicator once the cover plate 41 is removed, as described above.

FIG. 3B also shows the bourdon tube assembly partially inserted into the case 46, and the case 46 is cut away for viewing the internal components. On the bourdon tube shaft 28, a switch arm assembly 50 is attached to operate the adjustable switch assembly 36. The offset adjustment gears can be seen attached to the back side of the lower mounting plate 27 and connected to the zero offset adjustment shaft 33 providing easy access to adjust the position of the pointer 66 (see FIG. 5).

The 4 to 20 milliamp transmitter 38 is easily attached and removed with two mounting screws 52 and 53 that are threaded into an auxiliary mounting plate 40. The zero offset adjustment shaft 33 extends through the auxiliary mounting plate 40 and through a center hole 54 of the transmitter 39. During installation and assembly of the transformer or other equipment the control system is used for, it may be desirable not to have the transmitter 39 connected because high frequency waves from arc welding and other processes during the construction of the transformer may damage the transmitter 39.

An electrical connector 47 is shown attached to the lower part of the case 46. Wires to the switches and to the 4 to 20 milliamp loop connections of the transmitter 39 are soldered to the internal side of pins 55. A harness, not shown, attaches to the connector 47 and connects the switches to, for example, circulating pumps and fans to cool the transformer and also to a high temperature alarm and to a computer interface to convert the 4 to 20 milliamp signal to a voltage that can be converted to a digital signal for computer monitoring and data logging by a computer or data logger, or other processing unit.

The assembly is described in this manner to demonstrate the independence of the mechanical and electronic systems so that the commonality of accuracy over a wide environmental range provides a new benefit of enhanced reliability for critical control applications.

A discrepancy between the temperature readings provided by the mechanical and electronic temperature-responsive systems in this embodiment of the present invention is an indication of a failure of either the mechanical or electronic system that would not otherwise be detectable in currently employed systems.

The control systems described herein as the preferred embodiment applies to the control of large power transformers where the life of the transformer can be greatly increased and the operation of the transformer is not compromised by the need to power down for service. Application of the principles are not, however, limited by this example and the invention may be applied to many critical control situations.

Figure 4:
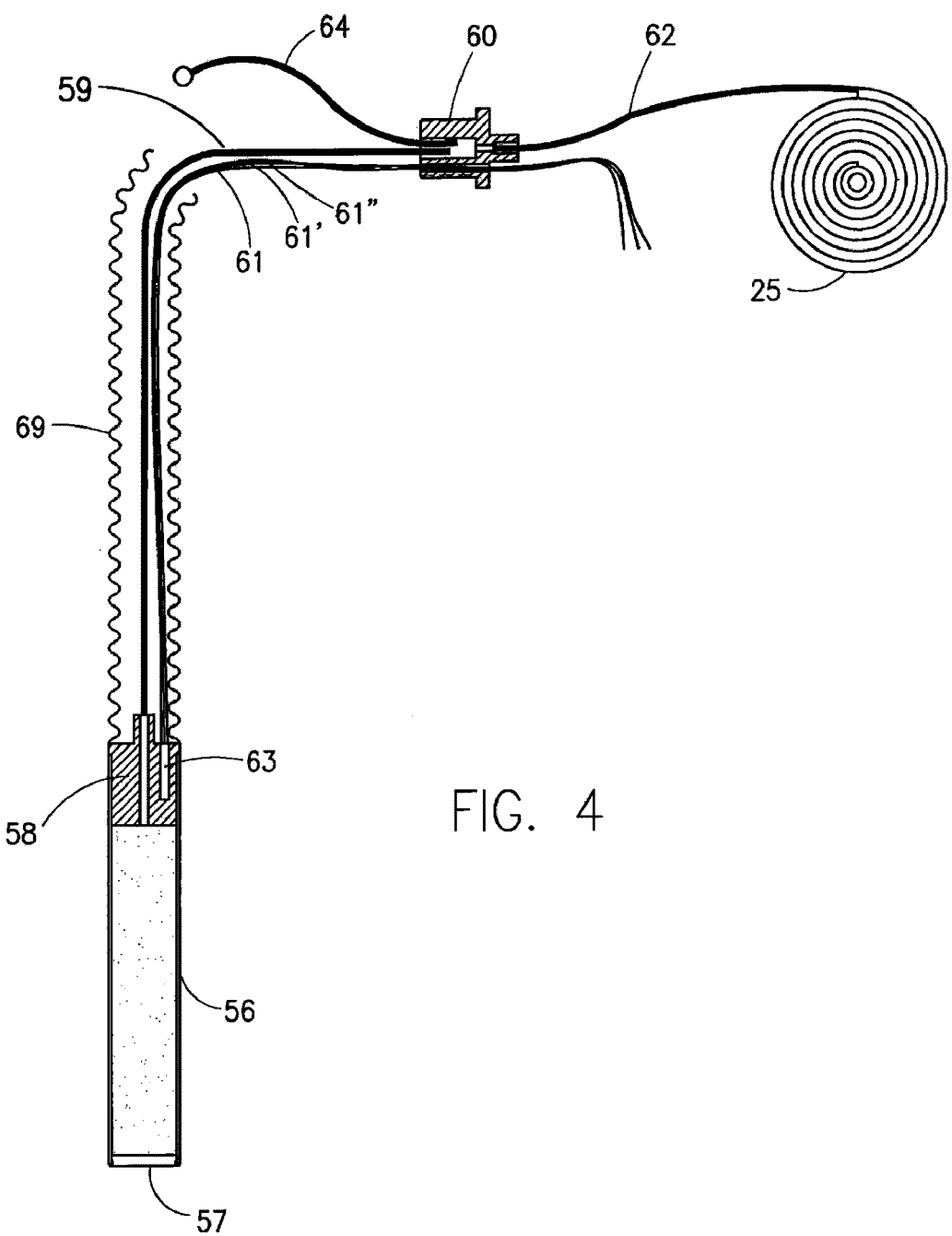
FIG. 4 shows a thermal system and cross-sectional view of the sensor.

FIG. 4 shows the sensor that is coupled to the bourdon tube 25 of the system shown in FIGS. 3A and 3B. The sensor comprises a rigid wall tube 56 defining a cavity having a fixed volume. The tube 56 can have a length of, for example, 100 mm and an outside diameter of, for example, 10 mm, and may be made from for example, stainless steel. A bottom plug 57 is welded or otherwise attached to one end of the tube 56 and a bulb connector 58 is welded or otherwise attached to the top of the tube 56. This is commonly called a temperature sensing bulb or simply a bulb. The bulb, in a gas filled system, may be filled with activated charcoal to adsorb nitrogen with decreasing temperature and desorb (outgas) nitrogen with increasing pressure thereby causing pressure changes with temperature that exceed the changes due to the natural gas laws where absolute pressure and temperature are directly proportional.

Bulb connector 58 includes a nose section that is welded or otherwise attached to a capillary 59 made from, for example, stainless steel. The capillary 59 can be anywhere from a few meters up to 20 meters. For short capillary systems, the volume of the capillary 59 is not significant and filling the bulb with a liquid, instead of activated carbon and gas, will work as the effect of the liquid expansion in the capillary due to temperature change is small when the capillary is short.

The capillary 59 is attached to a case connector 60 and a filling capillary 64 is also connected to the case connector 60. The inside of the case connector 60 is attached to a connecting capillary 62 leading to the spiral bourdon tube 25. All connections are made to provide air-tight seals and with minimum volume. The capillary 59 has a very small bore of about 0.13 mm diameter, and the coil may be constructed of, for example, edge-welded, 43% Nickel alloy to minimize internal volume and a change of elastic properties with temperature as with the inventor's earlier invention. The low volume and stable properties of the bourdon tube 25 are most important to having a low ambient temperature error and thus the system does not require a temperature compensator.

A PT100 resistance detection device (RTD) sensor 63 may be located in a hole in the bulb connector 58. Sensor 63 is in close thermal contact and substantially follows the same temperature of the entire bulb.

In addition, a spare sensor, not shown, can be embedded into the other side of the bulb connector 58 for use at a future date.

A thermocouple or thermistor can be used as the electronic sensor 63. The RTD sensor 63 includes three wire leads 61, 61' and 61" that follow the capillary 59 and are within a protective casing or flexible armor 69 and feed through the case connector 60 to the case assembly where the wires are attached to the aforementioned transmitter 39 by, for example, a screw terminal attachment. The third wire, commonly configured, is used to compensate for the line length and the resistance of the wires.

By removing the case window and then removing screws 44 and 45, access to the transmitter 39 and transmitter connections becomes possible.

Figure 5:
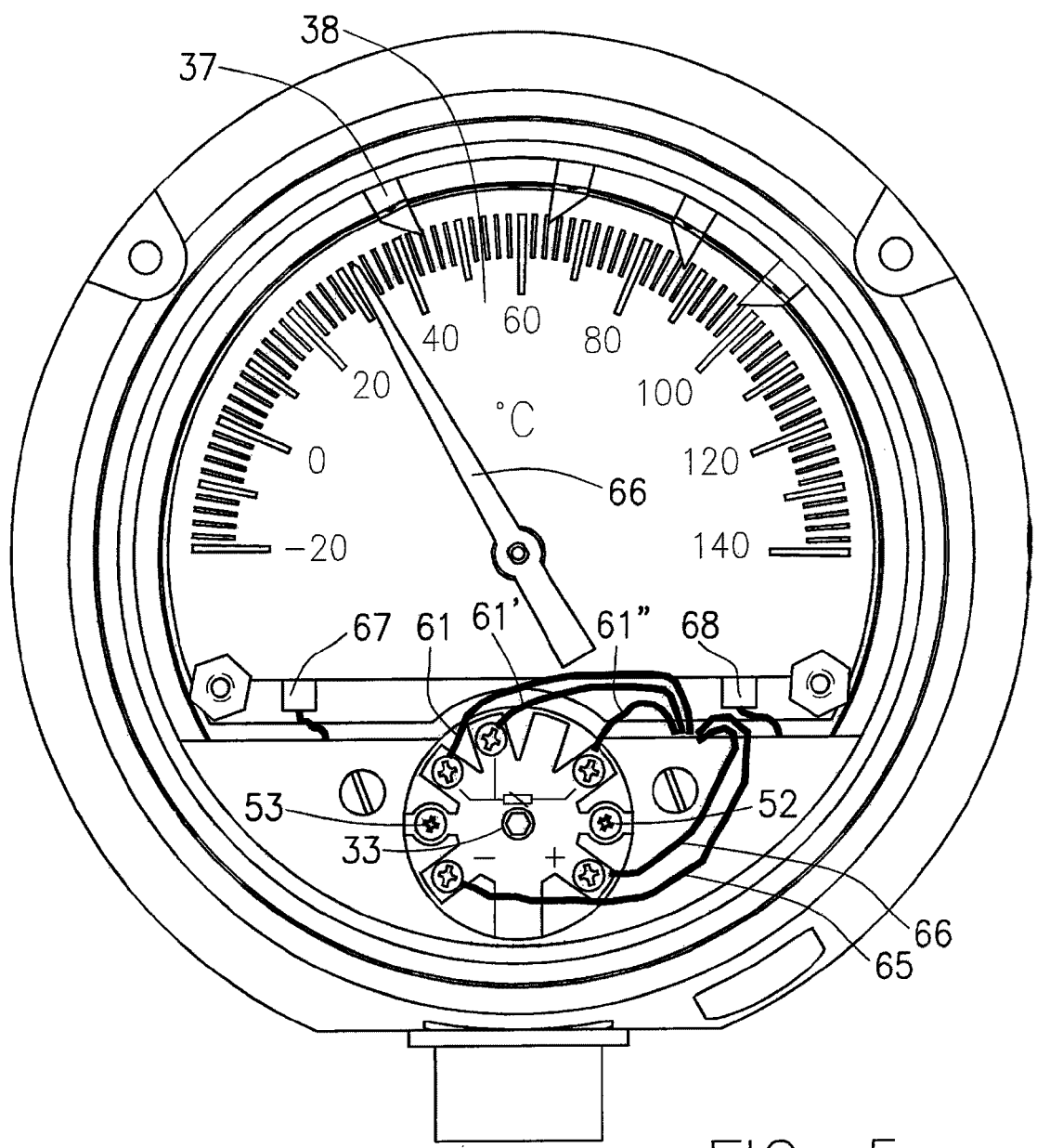
FIG. 5 is a frontal drawing of the controller and transmitter access.

Referring to FIG. 5, a front view of the control system is shown with the cover plate 41 removed. A pointer 66 is fixed to the shaft 28 and is rotatably driven by the spiral bourdon tube 25. A pointed end of the pointer 66 travels over the divisions in the scale 38. The scale 38 itself is normally printed on metal, laser etched or printed by a sublimation process. The laser etched method and the sublimation printing may be controlled by a computer enabling the nonlinearity of the scale to exactly match the output. Alternately, the scale 38 may be made as a mask having translucent divisions and numbers and is back-lighted with an electro-luminescent panel powered by alternating current attached to two tabs 67 and 68. 120 VAC 60 hertz or 220 VAC 50 Hertz can power the EL panel directly for readability at night or in the dark.

The zero offset adjustment shaft 33 has a slot or as shown in this embodiment, an Allen key recess, and is located inside the center hole of the transmitter 39. To replace the transmitter 39, a user must detach the wire connections from the sensor 63, i.e., wires 61, 61' and 61", and disconnect the loop 4 to 20 mA wires 65 and 66 and the two transmitter mounting screws 52 and 53, and then the transmitter 39 can easily be lifted off the zero offset adjustment shaft 33. A replacement transmitter can then be reattached in the reverse order.

For more critical applications as already explained, a second sensor may be attached to the bulb connector 58 and three spare wires are provided (not shown) so that in this manner, a sensor failure can also be easily repaired.

Transmitters are available that can be individually calibrated to improve accuracy, and this calibration is based on at least 5 points within the temperature range. A preferred transmitter is of a type that can be calibrated by a computer and the calibration data saved. One such transmitter is manufactured by PR Electronics in Denmark, model PR5335. The original calibration data may be saved according to the serial number and downloaded to a new transmitter for retrofit purposes.

Figure 6:
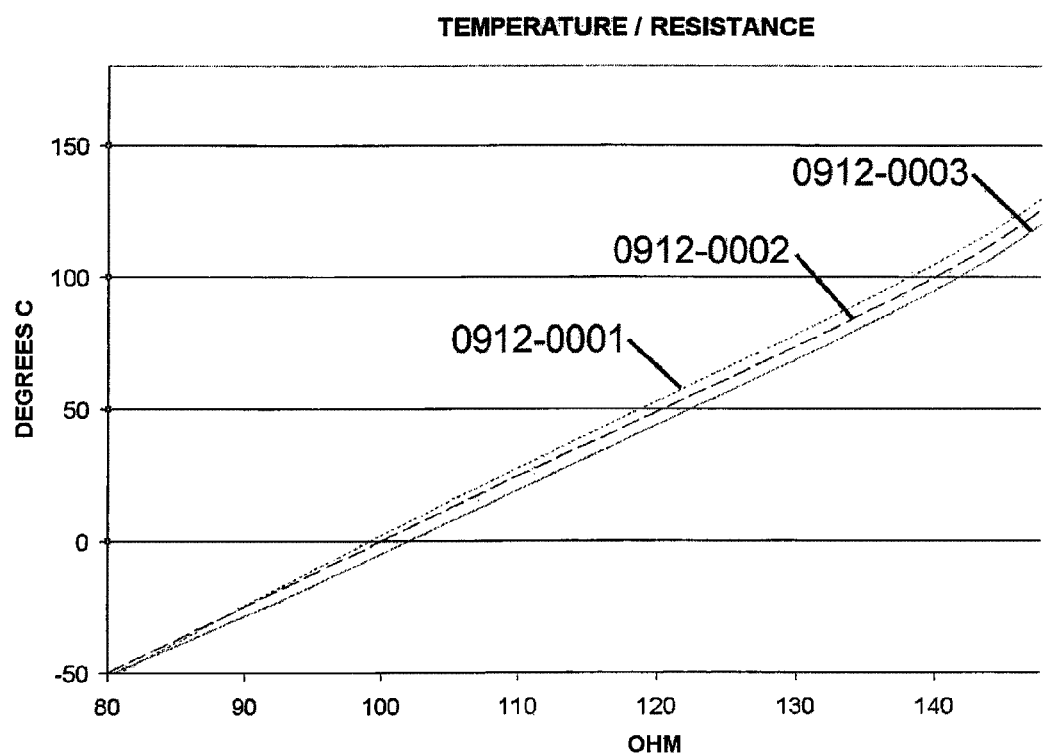
FIG. 6 is a graphical chart showing data for several sensors.

Referring now to FIG. 6, a plot of three slightly nonlinear curves for three sensors are shown, the differences are actually exaggerated for the sake of illustration. The plot is of the calibration data and shows a slight deviation from a straight line of a PT100 resistance detection device. Data for any serial number can be downloaded to a replacement transmitter. Replacement transmitters can also be supplied with the control system so that time is not wasted when failure of a transmitter is discovered. Generally, environmental conditions, such as lightning strikes that cause transients and what is called a ring wave, can damage transmitters, and salt air and moisture are also causes for electronic failure.

The independent dual, mechanical and electrical systems herein described have another advantage in that they can detect inaccuracies in either system. A current sensor attached to the switch wiring provides another input to the computer along with the transmitter analog signal.

When the temperature rises, the pointer 66 passes over the switch indicator 37, see FIG. 5, at 44° C. and the switch of the switch arm assembly 36 is activated by the switch arm positioned below the scale 38 as described above. A history of the transmitter signal when this switch is actuated is an indication of the status of the accuracy of both the mechanical and electronic system. If, for example, the transmitter 39 and switch indicator 37 indicate that over a period of time, this switch actuates at progressively higher temperatures, then this trend is an indication of a small leak in the filled system. Alternately, if the switch indicator 37 precedes the expected temperature, then a shift in the electronic signal indicates a failure of the electronic probe or transmitter 39.

Accordingly, a processor, such as a computer or data logger, is provided to compare a plurality of points over time at which the switch indicator, or an associated switch current sensor, determines that the switch of the switch arm assembly 36 is switched between on and off positions to the output signal of the transmitter 39. The processor also determines when the switch point deviates from preset limits indicative of failure or inaccuracy in either the mechanical temperature indicating system or the electronic temperature sensor 63.

A control system with a replaceable transmitter is an advantage as the cost of replacement is very small compared to powering down the equipment. In the invention, this is accomplished by the independence of the design of both the mechanical and electrical systems as described. Transmitters capable of generating output signals, such as RS232 or RS485 digital communication or even wireless signals, are also possible within the scope of the invention.

The foregoing structure thereby achieves and provides a dual and redundant temperature control for power transformers incorporating the reliability of a mechanical switch controller with a separate electronic sensor and transmitter. It also provides dual mechanical and electronic systems that may be matched in output to provide equal accuracy over the entire temperature measuring range and over a wide variation of ambient temperature conditions. Further, the structure enables easy replacement of an electronic transmitter without the need to power down the transformer with which the transmitter is associated. The invention also provides a method of comparing the mechanical and electronic temperature reading and automatically self checks to determine a fault in either of the independent systems.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A temperature indicating system, comprising:
a mechanical temperature-responsive system comprising a bourdon tube and a temperature bulb connected to the bourdon tube, the mechanical system being constructed to have a low ambient temperature error and being filled with a thermometric filling material; and
an electronic temperature system including at least one temperature sensor in thermal contact with the temperature bulb of the mechanical temperature-responsive system and which provides a temperature reading, and a replaceable electronic transmitter that transmit a signal derived from the temperature reading provided by the at least one temperature sensor,
the mechanical temperature-responsive system and the electronic temperature-responsive system providing substantially the same temperature reading over a wide ambient temperature range.

2. The system of claim 1, wherein the bourdon tube is a low volume, edge-welded bourdon tube, the bourdon tube is connected to the temperature bulb via a low volume capillary, and the thermometric filling material is a gas or a liquid.

3. The system of claim 1, where the bourdon tube is a spiral or helical.

4. The system of claim 1, wherein the at least one temperature sensor comprises a plurality of substantially equivalent electronic temperature sensors, each being in thermal contact with the temperature bulb.

5. The system of claim 1, wherein the electronic transmitter is calibrated and operates independent of the mechanical temperature-responsive system.

6. The system of claim 1, wherein the mechanical temperature-responsive system further comprises a rotatable pointer and a temperature-indicating scale over which the pointer rotates.

7. The system of claim 6, where the scale is a mask with backlighting.

8. The system of claim 1, wherein the thermometric material is pressurized gas or pressurized liquid.

9. The system of claim 8, wherein the mechanical temperature-responsive system further comprises activated carbon within the temperature bulb.

10. The system of claim 1, wherein the bulb comprises a rigid wall tube, a bottom plug attached to one end of the tube and a bulb connector attached to an opposite end of the tube, the bulb connector including a portion attached to a capillary.

11. The system of claim 10, further comprising:
a case connector, the capillary being attached to the case connector; and
a connecting capillary connecting the case connector to the bourdon tube.

12. The system of claim 11, further comprising an electronic temperature sensor, wherein the electronic temperature sensor is located in a hole in the bulb connector, further comprising wires leading from the electronic sensor through the case connector to the transmitter.

13. The system of claim 12, further comprising a protective casing arranged around the capillary and the wires.

14. The system of claim 10, wherein the electronic sensor is located in a hole in the bulb connector.

15. A temperature indicating system with built-in failure or inaccuracy detection, the system comprising:
- a mechanical temperature indicating system including a temperature bulb and a bourdon tube coupled to the bulb and which assumes a rotary position based on the temperature of the bulb;
- an electronic temperature sensor in thermal contact with the bulb;
- a transmitter connected to the electronic sensor and generating an output signal corresponding to the temperature of the bulb;
- a switch arranged to be actuated based on the rotary position of the bourdon tube;
- a switch sensor arranged to detect actuation of the switch; and
- a processor that compares a plurality of points over time at which the switch sensor determines that the switch is being actuated to the output signal of the transmitter and determines when the switch point deviates from preset limits indicative of failure or inaccuracy in either the mechanical temperature indicating system or the electronic temperature sensor.

16. The system of claim 15, wherein the switch switches between on and off positions, and the switch sensor detects when the switch switches between the on and off positions.

17. The system of claim 15, wherein the transmitter is replaceable and the replaceable transmitter has calibration data substantially equal to the transmitter being replaced.

18. The system of claim 15, wherein the sensor is a thermistor or a thermocouple.

19. A method for ensuring reliability of a temperature indicating system, comprising:
- determining temperature using a mechanical temperature indicating system including a temperature bulb and a bourdon tube coupled to the bulb and which assumes a rotary position over a scale based on the temperature of the bulb;
- determining temperature using an electronic temperature sensor in thermal contact with the bulb;
- generating using a transmitter, an output signal corresponding to the temperature of the bulb determined using the electronic temperature sensor;
- arranging at least one switch in association with the scale such that actuation of the at least one switch corresponds to a specific temperature as determined by the mechanical temperature indicating system;
- comparing using a processor, a plurality of points over time at which the switch is actuated to the output signal of the transmitter in order to determine deviation of the switch actuation point from preset limits indicative of failure or inaccuracy in either the mechanical temperature indicating system or the electronic temperature sensor.

20. The method of claim 19, further comprising:
- mounting the transmitter in connection with a common housing with the mechanical temperature indicating system and the electronic temperature sensor; and
- configuring the transmitter to be replaceable without requiring adjustment of the mechanical temperature indicating system or the electronic temperature sensor.

* * * * *